(12) United States Patent
Satoh et al.

(10) Patent No.: US 7,330,219 B2
(45) Date of Patent: Feb. 12, 2008

(54) YC SEPARATOR CIRCUIT

(75) Inventors: Yasunori Satoh, Tokyo (JP); Takaaki Akiyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 526 days.

(21) Appl. No.: 11/054,443

(22) Filed: Feb. 10, 2005

(65) Prior Publication Data
US 2006/0007361 A1    Jan. 12, 2006

(30) Foreign Application Priority Data
Jul. 7, 2004    (JP)    ............................. 2004/200503

(51) Int. Cl.
*H04N 9/77*    (2006.01)
(52) U.S. Cl. ..................................... 348/663
(58) Field of Classification Search ................ 348/663, 348/665, 668, 666, 669, 664, 667
See application file for complete search history.

(56) References Cited

U.S. PATENT DOCUMENTS

| | | | | |
|---|---|---|---|---|
| 5,333,054 A | * | 7/1994 | Tanaka et al. | ............... 348/666 |
| 5,473,389 A | * | 12/1995 | Eto et al. | ..................... 348/669 |
| 5,585,861 A | * | 12/1996 | Taniguchi et al. | .......... 348/669 |
| 5,990,978 A | * | 11/1999 | Kim et al. | ................... 348/663 |
| 6,288,754 B1 | * | 9/2001 | Ito | .............................. 348/663 |
| 6,674,488 B1 | * | 1/2004 | Satoh | .......................... 348/663 |

FOREIGN PATENT DOCUMENTS

| | | |
|---|---|---|
| JP | 10-174119 | 6/1998 |
| JP | 2003-299119 | 10/2003 |

* cited by examiner

*Primary Examiner*—Paulos M. Natnael
(74) *Attorney, Agent, or Firm*—Nixon Peabody LLP; Donald R. Studebaker

(57) ABSTRACT

A YC separator circuit which is capable of achieving YC separation at a high accuracy. The YC separator circuit comprises line memories, bandpass filters, an edge detector circuit, a color correlation determining circuit, and a YC separation filter circuit. The YC separator circuit separates a C signal from a composite signal using a two-line comb filter or a three-line comb filter. The subtractor subtracts the C signal separated by the YC separation filter circuit from the composite signal to separate a Y signal. A trap filter is a frequency filter for dividing a Y signal from a composite signal. A luminance correlation determining circuit calculates a difference between the Y signals received from the subtractor and trap filter, and outputs the Y signal separated by the subtractor when the difference is larger than a predetermined value, and outputs the Y signal separated by the trap filter when the difference is smaller than the predetermined value.

12 Claims, 8 Drawing Sheets

YC SEPARATOR CIRCUIT

BACKGROUND OF THE INVENTION

1. Field of the Invention

The present invention relates to a YC separator circuit for separating a composite signal of a television video and the like into a luminance signal and a color signal. The YC separator circuit according to the present invention is used, for example, in a digital video decoder and the like for decoding television video data.

2. Description of the Related Art

A television video signal is composed of a luminance signal (Y signal) representative of brightness, and a color signal (C signal) representative of color. The C signal is also demodulated using a color reference signal called a subcarrier for conversion into a Cr signal and a Cb signal. For processing video data, the Y signal and C signal are separately processed independent of each other. Therefore, for realizing a high image quality, the Y signal and C signal are desirably transmitted separately, and the C signal is desirably separated into the Cr signal and Cb signal for separate transmission. However, since a transmission through a single transmission line provides a higher transmission efficiency and easier handling, a high demand exists for the technique for sending a mixture of the Y signal and C signal. Thus, the YC separation technique for separating a composite signal composed of a Y signal and a C signal is also very important.

Known YC separation techniques are based on two types of frequency filters, a two-line comb filter, a three-line comb filter, and the like.

Figure 1A:
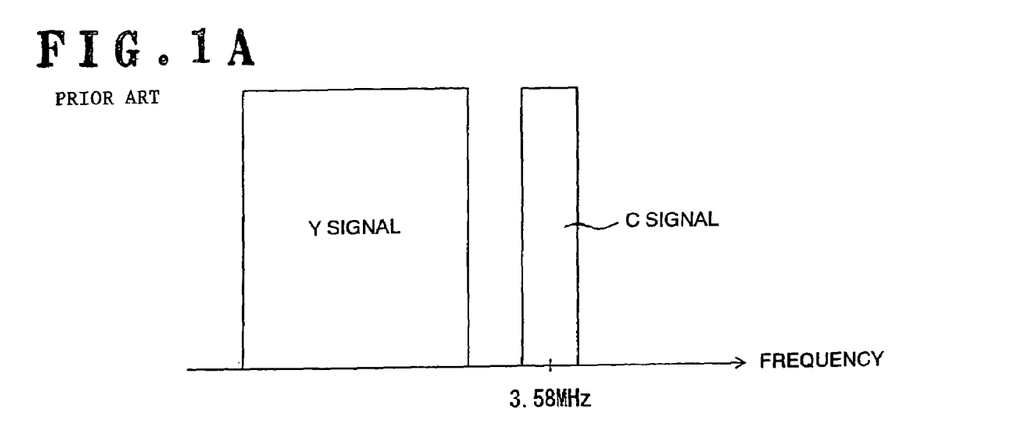
FIGS. 1A, 1B are conceptual diagrams for explaining the principle of YC separation.

(1) YC Separation Based on Two Types of Frequency Filters:

In a television video conforming to the NTSC (National Television Standards Committee) standard, the C signal has a center frequency at approximately 3.58 MHz. The Y signal in turn uses in principle a frequency band lower than the C signal (see FIG. 1A). When the frequency of the Y signal does not overlap the frequency of the C signal, the YC separation can be achieved only using two types of frequency filters. For example, the C signal can be separated from the composite signal using a bandpass filter which passes therethrough a frequency component near 3.58 MHz, and the Y signal can be separated from the composite signal using a trap filter for attenuating a frequency component near 3.58 MHz. Also, after separating the Y signal with the trap filter, the Y signal may be subtracted from the composite signal to separate the C signal.

Figure 1B:
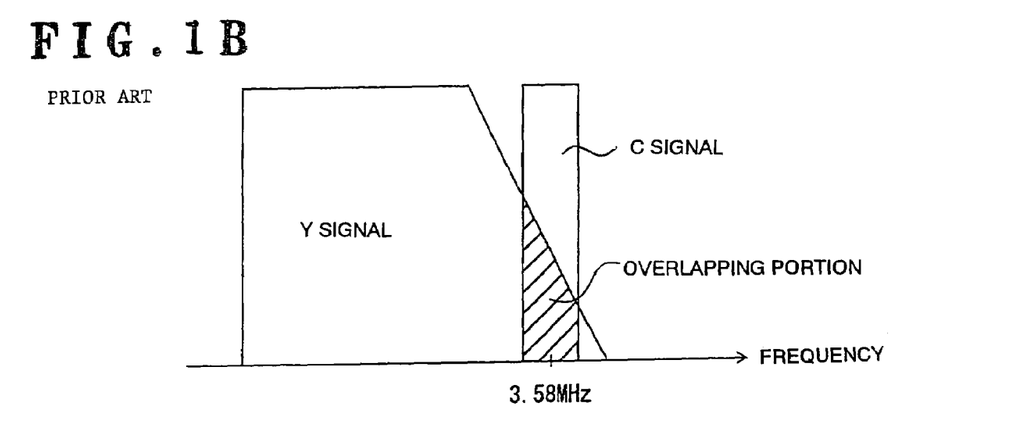
Figure 2A:
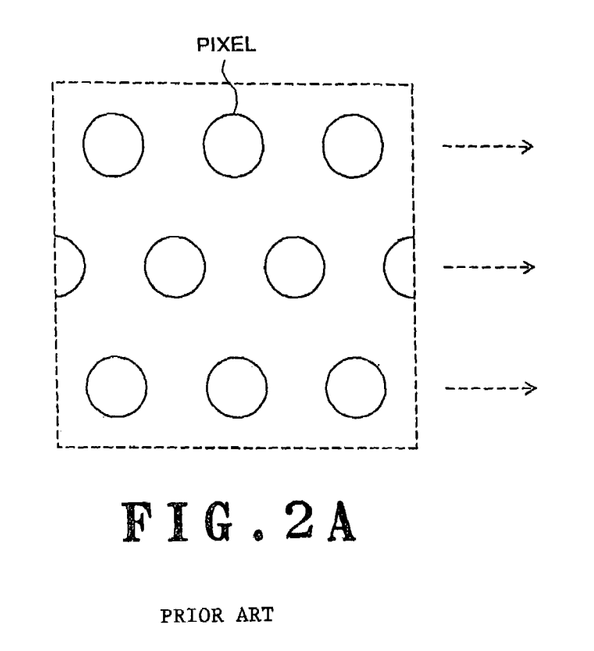
FIGS. 2A, 2B are conceptual diagrams for explaining the principle of YC separation.
Figure 2B:
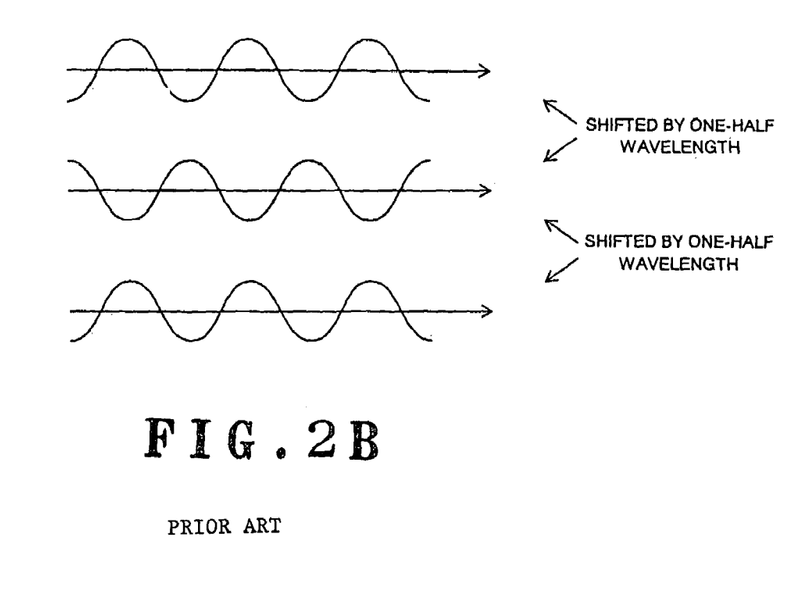

(2) YC Separation Based on Two-Line Comb Filter:

At boundaries at which a video changes in the extreme, the frequency of a Y signal may overlap the frequency of a C signal (see FIG. 1B). A two-line comb filter is known to have the ability to remove the influence of such overlapping. In the television video, the position of pixels shifts by one-half period between two sequential horizontal lines (see FIG. 2A), and therefore, the phase of the C signal shifts by one-half wavelength (see FIG. 2B). On the other hand, the phase of the Y signal is the same. Therefore, when there is a correlation between these two horizontal lines (i.e., video data matches), the difference between composite signals on both lines is twice as much as the C signal. The two-line comb filter takes advantage of this principle to separate a C signal from a composite signal. Then, the C signal thus acquired can be subtracted from the composite signal to separate a Y signal.

(3) YC Separation Based on Three-Line Comb Filter:

When there is a correlation among three sequential horizontal lines, the YC separation can be achieved using a three-line comb filter. The three-line comb filter comprises a pair of two-line comb filters, and a processor. One of the two-line comb filters separates a C signal using a horizontal line subjected to the YC separation, and the preceding horizontal line. The other two-line comb filter separates a C signal using the horizontal line subjected to the YC separation, and the following horizontal line. Then, the processor calculates an average value of these two C signals.

When the two-line comb filter or three-line comb filter is used as described above, it is necessary to determine the correlation between two or three sequential horizontal lines. Generally, the sum of C signals on these horizontal lines is used for the determination of the correlation. Specifically, rough C signal values are found from composite signals of sequential horizontal lines using a bandpass filter as mentioned above, and it is determined that there is a correlation between both lines when the sum of these values is equal to or less than a predetermined value. When no Y signal is mixed in the C signal, the sum of C signals on two sequential horizontal lines are zero (see FIGS. 2A, 2B). Even when the Y signal is mixed in the C signal, a rough correlation can be known for the C signal. However, this method can determine that there is a correlation even though a small color difference exists between horizontal lines. When a correlation is erroneously determined, the C signal will be mixed in the Y signal when the C signal is subtracted from the composite sinal to separate the Y signal. The Y signal mixed in the C signal makes dot interference more likely to occur. The dot interference is the phenomenon of displaying small dots in regions in which colors are discontinuous.

Also, when neither the two-line comb filter nor the three-line comb filter is used, a Y signal may be mixed in a C signal. The Y signal mixed in the C signal makes cross color more likely to occur. The cross color is the phenomenon of displaying small stripe patterns.

For preventing the dot interference and cross color, Japanese Patent Kokai No. 10-174119 (Patent Document 1) and No. 2003-299119 (Patent Document 2) are known.

A YC separator circuit of Patent Document 1 relies on a Y signal to determine the correlation. Then, this YC separator circuit multiplies the result of processing indicative of a correlation by a predetermined weighting coefficient to facilitate a determination of the presence of the correlation. In other words, this YC separator circuit intentionally increases the probability of determining that there is a correlation to prevent the cross color.

A YC separator circuit of Patent Document 2 separates a C signal from a composite signal using a bandpass filter, and further removes a burst amplitude from the C signal to prevent the dot interference and cross color.

However, the YC separator circuits disclosed in Patent Documents 1, 2 fail to sufficiently prevent the dot interference and cross color.

SUMMARY OF THE INVENTION

It is an object of the present invention to provide a YC separator circuit which is capable of achieving a high-quality YC separation.

The present invention provides a YC separator circuit which comprises a color signal separator circuit for separating a color signal from a composite signal using a two-line comb filter or a three-line comb filter, a first luminance signal separator circuit for separating a luminance signal by subtracting the color signal separated by the color signal separator circuit from the composite signal, a second luminance signal separator circuit for separating a luminance signal from the composite signal using a frequency filter, a luminance correlation determining circuit for calculating a difference between respective luminance signals input from the first and second luminance signal separator circuits, and a selector circuit for selectively outputting the luminance signal separated by the first luminance signal separator circuit when the difference is larger than a predetermined value, and for selectively outputting the luminance signal separated by the second luminance signal separator circuit when the difference is smaller than a second predetermined value (first predetermined value=second predetermined value).

According to the present invention, any of the luminance signals is selected in accordance with a difference between a luminance signal separated using the two-line comb filter or three-line comb filter, and a luminance signal separated using a frequency filter, so that the luminance signal can be separated with a mixture of few color signal.

DETAILED DESCRIPTION OF THE INVENTION

In the following, embodiments of the present invention will be described with reference to the drawings. In the drawings, the size, shape, and positional relationship of each component are generally shown merely to such a degree that the present invention can be understood, and numerical conditions described below are simply illustrative.

First Embodiment

A YC separator circuit according to a first embodiment will be described with reference to FIGS. 3 and 4.

Figure 3:
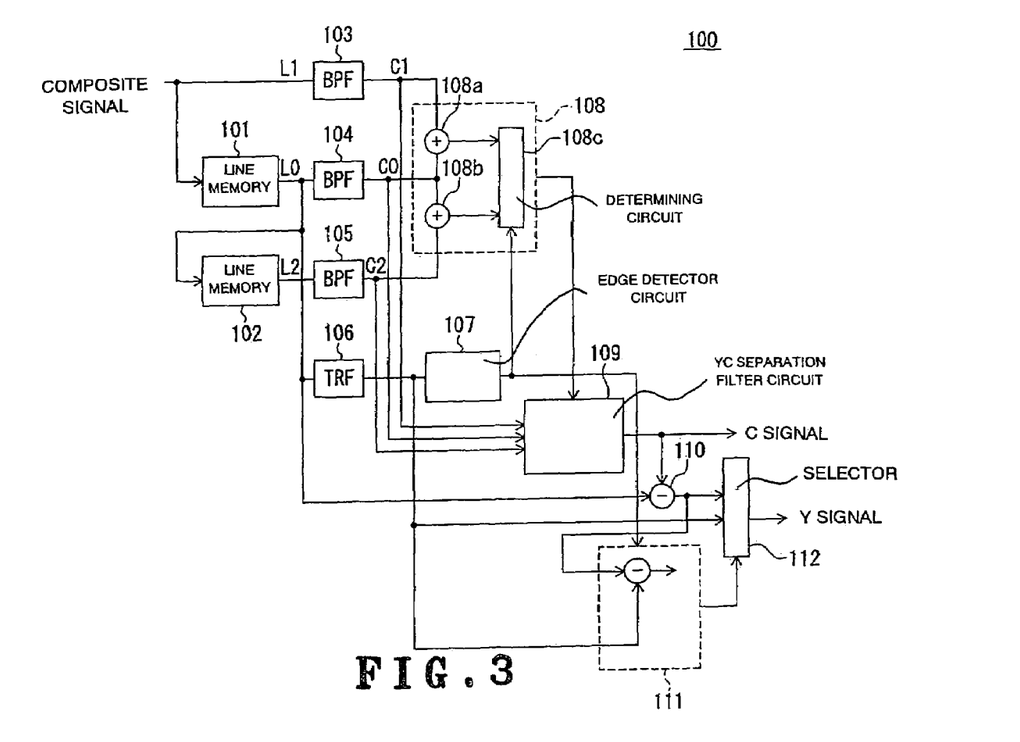
FIG. 3 is a block diagram generally showing the overall configuration of a YC separator circuit according to a first embodiment.

FIG. 3 is a block diagram generally showing the configuration of the YC separator circuit 100 according to this embodiment. As shown in FIG. 3, the YC separator circuit 100 of this embodiment comprises line memories 101, 102; bandpass filters 103-105; a trap filter 106; an edge detector circuit 107; a color correlation determining circuit 108; a YC separation filter circuit 109; a subtractor 110; a luminance correlation determining circuit 111; and a selector 112.

The line memory 101 is a temporarily preserving memory for delaying a composite signal input from the outside by a time equivalent to one horizontal line. The line memory 102 in turn is a temporarily preserving memory for delaying a composite signal input from the line memory 101 by a time equivalent to one horizontal line. Here, the composite signal output from the line memory 101 is a composite signal on a horizontal line L0 which is subjected to a YC separation. Also, the composite signal input from the outside is a composite signal on a horizontal line L1 which is positioned immediately after the subjected horizontal line L0. In addition, a composite signal output from the line memory 102 is a composite signal on a horizontal line L2 which is positioned immediately before the subjected composite signal.

The bandpass filter 103 extracts a frequency component C1 corresponding to a C signal from a composite signal input from the outside. The bandpass filter 104 in turn extracts a frequency component C0 corresponding to a C signal from a composite signal output by the line memory 101. The bandpass filter 105 extracts a frequency component C2 corresponding to a C signal from the composite signal output by the line memory 102. As mentioned above, when a C signal overlaps a Y signal, a Y signal component can be mixed in the signals C0-C2 separated by the bandpass filters 103-105 (see FIG. 1B).

The trap filter 106 passes therethrough other than the frequency component corresponding to the C signal from the composite signal output by the line memory 101. Therefore, when a C signal overlaps a Y signal, a Y signal Y0 separated by the trap filter 106 does not include a portion which overlaps the C signal.

The edge detector circuit 107 detects an edge at which a luminance level changes using the output Y0 of the trap filter 106. The edge detector circuit 107 compares Y signals between adjacent pixels on the same horizontal line, and determines that the luminance level has changed when the difference between these Y signals is equal to or more than a predetermined value. Then, when the luminance level has changed, the edge detector circuit 107 outputs a signal indicative of the detection of a changing edge. The internal configuration of the edge detector circuit 107 will be described later with reference to FIG. 4.

The color correlation determining circuit 108 determines a correlation between the C signals extracted by the bandpass filters 103-105. The color correlation determining circuit 108 comprises adders 108a, 108b, and a determining circuit 108c. The adder 108a adds C signals output from the bandpass filters 103, 104. The adder 108b adds C signals output from the bandpass filters 104, 105. The determining circuit 108c selects a method of separating the C signal using the results of the calculations performed by the adders 108a, 108b and the result of the detection made by the edge detector circuit 107. The result of the selection is sent to the YC separation filter circuit 109. A method of determination made by the determining circuit 108c will be described later in greater detail.

The YC separation filter circuit 109 separates the C signal using a method selected by the color correlation determining circuit 108.

The subtractor 110 subtracts the C signal output by the YC separation filter circuit 109 from the composite signal output by the line memory 101 to separate a Y signal.

The luminance correlation determining circuit 111 calculates a difference between the Y signal output by the trap filter 106 and the Y signal output by the subtractor 110. When the edge detector circuit 107 does not detect an edge, the luminance correlation determining circuit 111 selects a Y signal in accordance with this difference value. Specifically, the luminance correlation determining circuit 111 selects the subtractor 110 when the difference is larger than a predetermined value, and selects the trap filter 106 when the difference is smaller than the predetermined value. On the other hand, when the edge detector circuit 107 detects an edge, the subtractor 110 is selected. The result of the selection is sent to the selector 112.

The selector 112 selectively outputs one of the Y signal output by the trap filter 106 and the Y signal output by the subtractor 110 in accordance with the result of the selection made by he luminance correlation determining circuit 111.

Figure 4:
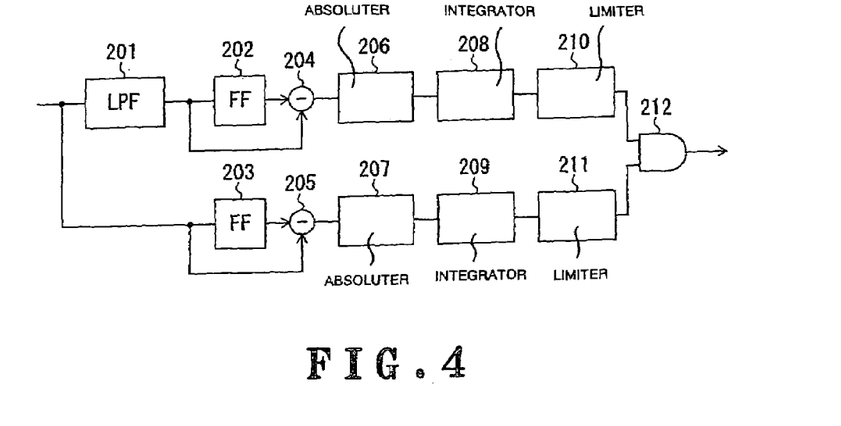
FIG. 4 is a block diagram generally showing the internal configuration of an edge detector circuit according to the first embodiment.

FIG. 4 is a block diagram showing the internal configuration of the edge detector circuit 107. As shown in FIG. 4, the edge detector circuit comprises a low pass filter 201; flip-flops 202, 203; subtractors 204, 205; absoluters 206, 207; integrators 208, 209; limiters 210, 211; and an AND gate 212.

The low pass filter 201 passes therethrough frequency components lower than the frequency band of the C signal from the signal Y0 input from the trap filter 106 (see FIG. 3). The flip-flop 02 delays the signal output by the low pass filter 201 by a time equivalent to one pixel, and outputs the signal. Then, the subtractor 204 outputs a difference between the signal Y0 output by the low pass filter 201 and the signal Y0 output by the flip-flop 202. In other words, the subtractor 204 outputs a difference between a pixel output by the low pass filter 201 and a pixel preceding thereto. The absoluter 206 outputs the absolute value of the difference output by the subtractor 204. The integrator 208 integrates the absolute value output by the absoluter 206 for a predetermined time. The limiter 210 is a circuit for restricting an input value of the AND gate 212. In other words, the limiter 210 outputs the integrated value as it is when the integrated value output by the integrator 208 is smaller than a predetermined upper limit value, and outputs the upper limit value when the integrated value is larger than the predetermined upper limit value. The limiter 210 goes to a low level when a changing edge is detected, and to a high level when a changing edge is not detected.

The flip-flop 203 delays a signal output by the trap filter 106 by one pixel and outputs the delayed signal. The subtractor 205 outputs a difference between the signal Y0 output by the trap filter 106 and the signal Y0 output by the flip-flop 203. The absoluter 207 outputs the absolute value of the difference output by the subtractor 205. The integrator 209 integrates the absolute value output by the absoluter 207 for a predetermined time and outputs the integrated value. The limiter 211 outputs the integrated value output by the integrator 209 as it is when it is smaller than a predetermined upper limit, and outputs the upper limit value when the integrated value output by the integrator 209 is smaller than the upper limit value. The limiter 211 goes to low level when a changing edge is detected, and to high level when no changing edge is detected.

Then, the AND gate 212 outputs a logical AND of the limiters 210, 211. In this way, when a changing edge is detected in at least one of the signal Y0 which is passed through the low pass filter and the signal Y0 which is not passed through the low pass filter, it is determined that a luminance changing edge is detected.

The edge detector circuit 107 in FIG. 4 detects an edge of the signal Y0 which has been planarized using the low pass filter 201, and an edge of the signal Y0 which is not planarized. In this way, the edge can be detected at a high accuracy.

Next, the operation of the YC separator circuit 100 according to this embodiment will be described.

First, composite signals on respective horizontal lines L0, L1, L2 are input sequentially from the outside. The line memory 101 sequentially receives these composite signals, delays them by a time equivalent to one horizontal line, and outputs the delayed composite signals. Also, the line memory 102 sequentially receives the composite signals from the line memory 101, again delays the composite signals by a time equivalent to one horizontal line, and outputs the delayed composite signals. In this way, the bandpass filter 103-105 are applied with composite signals corresponding to three sequential horizontal lines in parallel. The bandpass filters 103-105 separate C signals C0, C1, C2 from these composite signals. The separated C signals C0, C1, C2 are sent to the color correlation determining circuit 108.

The trap filter 106 receives the composite signals output by the line memory 101 (i.e., a composite signals subjected to the YC separation), and separates the Y signal Y0 therefrom. Then, the edge detector circuit 107 detects a changing edge of the signal Y0. A changing edge detection signal is sent to the color correlation determining circuit 108 and to luminance correlation determining circuit 111.

The adder 108a of the color correlation determining circuit 108 calculates the sum of the C signals C0, C1. As mentioned above, C signals on two sequential horizontal lines have the phases shifted by one-half wavelength (see FIGS. 2A, 2B), so that the result of the calculation is zero when there is a correlation between these signals C0, C1. However, even if there is a correlation, the calculation will not result in complete zero if a Y-signal component is mixed in these C signals C0, C1. Therefore, when the result of the calculation is smaller than a predetermined value, it is determined that there is the correlation between the signals C0, C1. Similarly, the adder 108b calculates the sum of the C signals C0, C2 to determine the presence or absence of a correlation. When there is the correlation between the signals C0, C1, and when there is a correlation between the signals C0, C2, it is determined that there is a correlation among the three signals C0, C1, C2.

Further, the determining circuit 108c of the color correlation determining circuit 108 selects a YC separation method in the following manner using the result of the determination and the result of the detection made by the edge detector circuit 107.

First, when no changing edge is detected, the determining circuit 108c selects a three-line comb filter based separation method if there is a correlation among the signals C0, C1, C2; selects a two-line comb filter based separation method using the signals C0, C1 when there is a correlation between the signals C0, C1; and selects a two-line comb filter based separation method using the signals C0, C2 when there is a correlation between the signals C0, C2. Further, when the correlation does not at all exist, the determining circuit 108c selects the three-line comb filter based separation method. The three-line comb filter based separation method is used when the correlation does not at all exist because it is rare that the correlation does not at all exist in three sequential horizontal lines, and therefore the entire screen will not significantly affected even if the three-line comb filter based separation method is used in spite of the absence of the correlation. Alternatively, in such a case, the YC separator circuit 100 may be designed such that the output of the trap filter 106 is employed as a Y signal without fail.

On the other hand, when a changing edge is detected, the determining circuit 108c selects the three-line comb filter based separation method if the result of the correlation determination has changed from the preceding pixel; and selects the same separation method as the preceding pixel if the result of the correlation determination is the same as the preceding pixel. The three-line comb filter based separation method is used when the result of the correlation determination has changed because it is rare that the correlation does not at all exist in three sequential horizontal lines, and therefore the entire screen will not significantly affected even if the three-line comb filter based separation method is used in spite of the absence of the correlation. Alternatively, in such a case, the determination on the correlation may be made again.

The YC separation filter circuit 109 separates the C signal using the separation method selected by the color correlation determining circuit 108. Specifically, when the color correlation determining circuit 108 selects the two-line comb filter based separation method using the signals C0, C1, the C separator filter circuit 109 divides a difference between the signals C0, C1 by two to separate the C signal. On the other hand, when the color correlation determining circuit 108 selects the two-line comb filter based separation method using the signals C0, C2, the YC separation filter circuit 109 divides the difference between the signals C0, C2 by two to separate the C signal. Further, when the color correlation determining circuit 108 selects the three-line comb filter based separation method, the YC separation filter circuit 109 calculates an average value of "the difference between the signals C0, C1 divided by two" and "the difference between the signals C0, C2 divided by two" to separate the C signal. The C signal thus separated is output to the outside and is also sent to the subtractor 110.

The subtractor 110 separates the Y signal by subtracting the C signal output by the YC separation filter circuit 109 from the composite signal, as mentioned above. This Y signal is sent to the selector 112 and to the luminance correlation determining circuit 111.

The luminance correlation determining circuit 111 selects any of these Y signals based on the difference between the Y signals, and the edge detection signal, as mentioned above. Then, the selector 112 outputs a Y signal in accordance with the result of the selection.

As mentioned above, at a boundary at which colors can change in the extreme, the frequency of the Y signal is likely to overlap the frequency of the C signal (see FIG. 1B). Even when the Y signal overlaps the C signal, it is possible to obtain the C signal free of a mixed Y-signal component by using the two-line comb filter based separation method or three-line comb filter based separation method, and therefore, the Y signal separated by the subtractor 110 has a value close to the actual Y signal. On the other hand, the Y signal separated by the trap filter 106 has a very small value as compared with the actual Y signal because a Y-signal component overlapping the C signal has been removed. Thus, the more the Y signal overlaps the C signal, a larger difference is calculated by the luminance correlation determining circuit 111. Therefore, when the difference is larger than the predetermined value, the Y signal separated by the subtractor 110 is preferably used.

On the other hand, when horizontal lines with a small color difference continue, the presence of a correlation can be determined. In this event, the C signal separated using the two-line comb filter based separation method or three-line comb filter based separation method is not correct. Thus, the Y signal separated by the processor 110 also presents an incorrect value. Meanwhile, in a portion in which a color change is small, the frequency of the Y signal is less likely to overlap the frequency of the C signal (see FIG. 1A). Thus, the Y signal separated by the trap filter 106 presents a value close to the actual Y signal. Also, when the color difference is small, the C signal also has a small value, and therefore, the difference calculated by the luminance correlation determining circuit 111 is small as well. Consequently, when the difference is smaller than a predetermined value, the Y signal separated by the trap filter 106 is preferably used.

For the reasons set forth above, when no luminance changing edge is detected, the Y signal may be used in accordance with the magnitude of the difference calculated by the luminance correlation determining circuit 111, thereby obtaining the Y signal close to an actual value at all times.

Second Embodiment

Figure 7A:
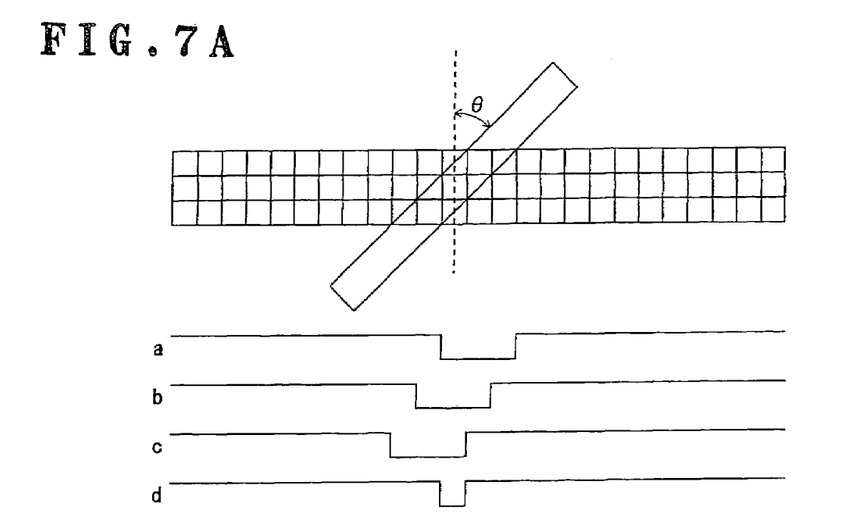
FIGS. 7A and 7B are conceptual diagrams for explaining the operation of the YC separator circuit according to the second embodiment.
Figure 7B:
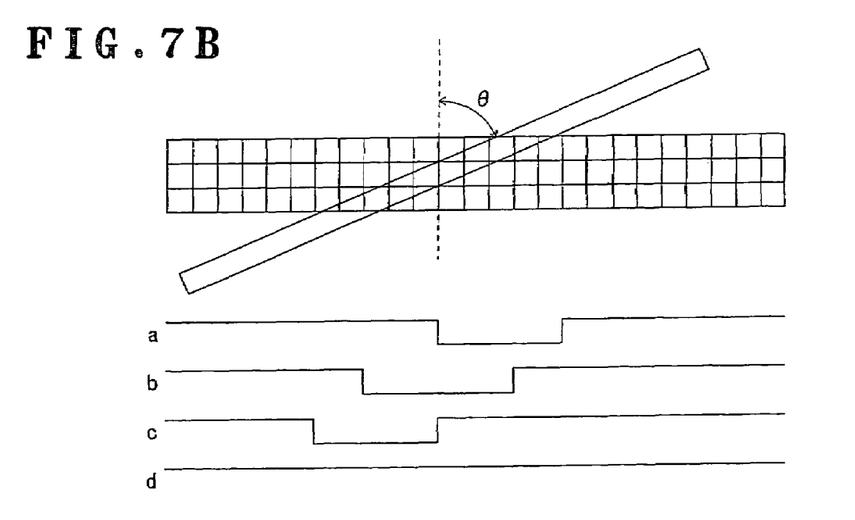

Next, a YC separator circuit according to a second embodiment will be described with reference to FIGS. 5, 7A, 7B.

Figure 5:
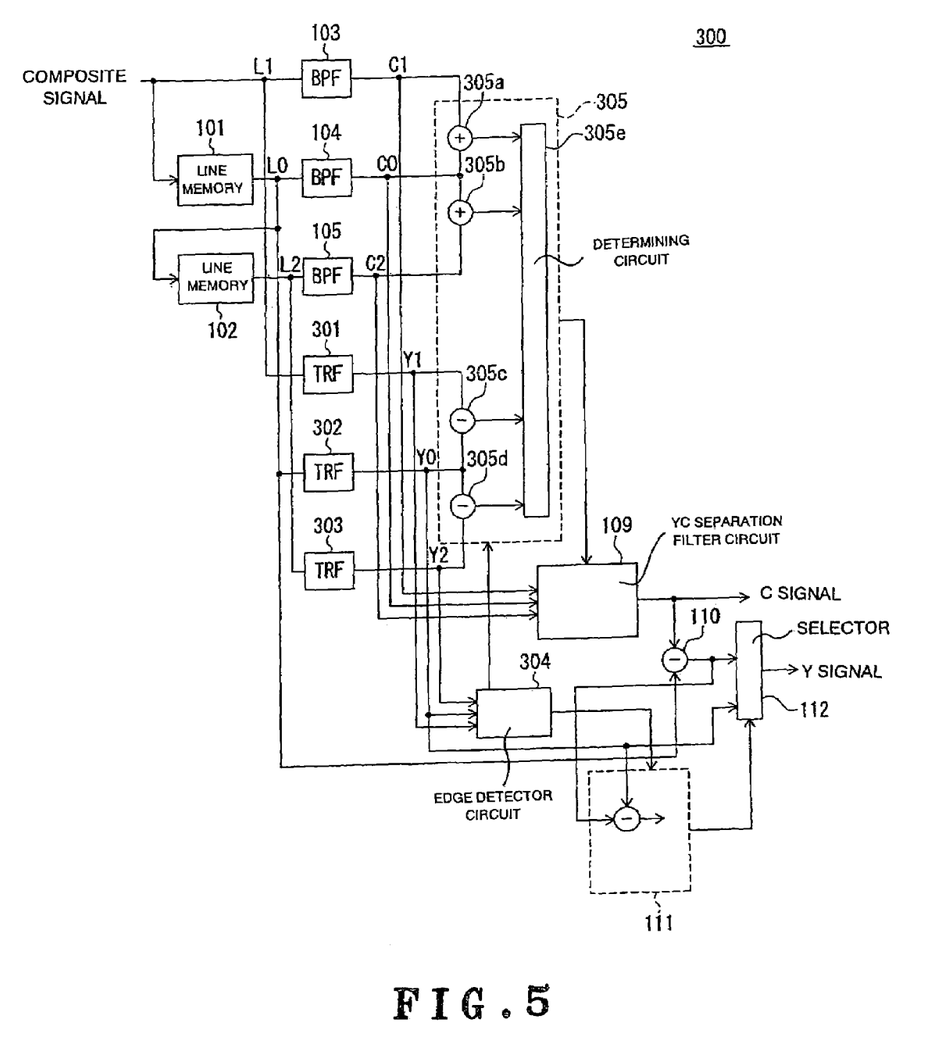
FIG. 5 is a block diagram generally showing the overall configuration of a YC separator circuit according to a second embodiment.

FIG. 5 is a block diagram generally showing the configuration of the YC separator circuit 300 according to this embodiment. In FIG. 5, components designated the same reference numerals as those in FIG. 3 identify the same components in FIG. 3, respectively.

A trap filter 301 extracts a frequency component Y1 corresponding to a Y signal from a composite signal input from the outside. A trap filter 302 in turn extracts a frequency component Y0 corresponding to the Y signal from a composite signal output by a line memory 101. A trap filter 303 extracts a frequency component Y2 corresponding to the Y signal from a composite signal output by a line memory 102.

An edge detector circuit 304 detects a luminance level changing edge for each horizontal line using the signals Y0-Y2. Then, when changing edges are detected in all of the horizontal lines L0-L2, the edge detector circuit 304 outputs a signal indicating that the changing edges are detected. The internal configuration of the edge detector circuit 304 will be described later with reference to FIG. 4.

A color/luminance correlation determining circuit 305 determines a correlation among the C signals extracted by the bandpass filters 103-105, and a correlation among the Y signals extracted by the trap filters 301-303. The color/luminance correlation determining circuit 305 comprises adders 305a, 305b; subtractors 305c, 305d; and a determining circuit 305e. The adder 305a adds the C signals output from the bandpass filters 103, 104. The adder 305b adds the C signals output from the bandpass filters 104, 105. The subtractor 305c subtracts the Y signals output from the trap filters 301, 302. The subtractor 305d subtracts the Y signals output from the bandpass filters 302, 303. The determining circuit 305e selects a C-signal separation method using the result of the calculations made by the processors 305a-305d, and the result of the detection made by the edge detector circuit 304. The result of the selection is sent to the YC separation filter circuit 109. A determination method implemented by the determining circuit 305e will be later described in detail.

Figure 6:
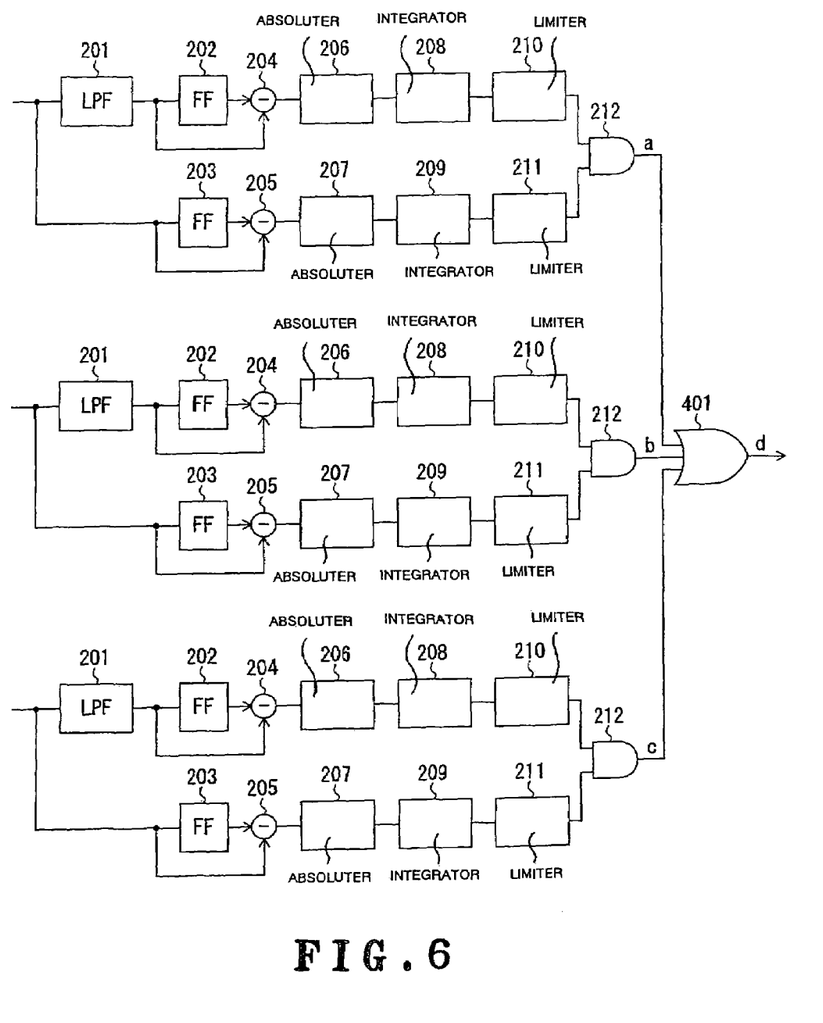
FIG. 6 is a block diagram generally showing the internal configuration of an edge detector circuit according to the second embodiment.

FIG. 6 is a block diagram illustrating the internal configuration of the edge detector circuit 304. In FIG. 6, components designated the same reference numerals as those in FIG. 4 identify the same components as in FIG. 4.

As can be appreciated from FIG. 6, the edge detector circuit 304 of this embodiment comprises three circuits similar to that in the first embodiment in parallel. Then, a logical OR of AND gates 212, 212, 212 is output from an OR gate 401. In this way, only when changing edges are detected from all the Y signals Y0, Y1, Y2, the OR gate 401 outputs a signal indicating that the changing edges are detected.

Next, the operation of the YC separator circuit 300 of this embodiment will be described.

First, composite signals of respective horizontal lines are sequentially input from the outside. The line memory 101 sequentially receives these composite signals, delays them by a time equivalent to one horizontal line, and outputs the delayed composite signals. Further, the line memory 102 sequentially receives the composite signals from the line memory 101, delays them by a time equivalent to one horizontal line, and outputs the delayed composite signals.

In this way, the bandpass filters 103-105 are applied with the composite signals corresponding to three sequential horizontal lines in parallel. The bandpass filters 103-105 separate C signals C0, C1, C2 from these composite signals. The separated C signals C0, C1, C2 are sent to the color/luminance correlation determining circuit 305.

Similarly, the trap filters 301-303 are applied with the composite signals corresponding to three sequential horizontal lines in parallel. The trap filters 301-303 separate Y signals Y0, Y1, Y2 from these component signals. The separated Y signals Y0, Y1, Y2 are sent to the edge detector circuit 304 and to the color/luminance correlation determining circuit 305.

The edge detector circuit 304 detects a changing edge in the signals Y0, Y1, Y2. Then, when one or more types of luminance changes are detected in the signals Y0, Y1, Y2, the edge detector circuit 304 determines that changing edges are detected. A changing edge detection signal is sent to the color/luminance correlation determining circuit 305 and to the luminance correlation determining circuit 111.

The adder 305a of the color/luminance correlation determining circuit 305 calculates the sum of the C signals C0, C1. As mentioned above, on two sequence horizontal lines, the phases of the C signals are sifted from one to another by one-half wavelength (see FIGS. 2A, 2B), so that the calculation results in zero when there is a correlation between these signals C0, C2. However, even if there is a correlation, the calculation will not result in complete zero if a Y-signal component is mixed in these C signals C0, C1. Therefore, when the result of the calculation is smaller than a predetermined value, it is determined that there is a correlation between the signals C0, C1. Similarly, the adder 305b calculates the sum of the C signals C0, C2 to determine the presence or absence of a correlation. When there is the correlation between the signals C0, C1, and when there is the correlation between the signals C0, C2, it is determined that there is a correlation among the three signals C0, C1, C2.

The subtractor 305c of the color/luminance correlation determining circuit 305 calculates a difference between the Y signals Y0, Y1. As mentioned above, the Y signals are not shifted in phase between two sequential horizontal lines, the processing results in zero when there is a correlation between the Y signals Y0, Y1. As is the case with the aforementioned C signal, when the result of the calculation is smaller than a predetermined value, it may be determined that there is a correlation. Similarly, the subtractor 305d calculates a difference between the Y signals Y0, Y2. When there is a correlation between the signals Y0, Y1, and when there is a correlation between the signals Y0, Y2, it is determined that there is a correlation among the three signals Y0, Y1, Y2.

The color/luminance correlation determining circuit 305 of this embodiment determines that there is a correlation among three sequential horizontal lines only when there is a correlation among the signals C0, C1, C2 and when there is a correlation among the signal Y0, Y1, Y2. Also, the color/luminance correlation determining circuit 305 determines that there is a correlation between a horizontal line subjected to the YC separation and the following horizontal line only when there is a correlation between the signals C0, C1 and when there is a correlation the signals Y0, Y1. Further, the color/luminance correlation determining circuit 305 determines that there is a correlation between a horizontal line subjected to the YC separation and the preceding horizontal line only when there is the correlation between the signal C0, C2 and when there is the correlation between the signals Y0, Y2. For other cases, the color/luminance correlation determining circuit 305 determines that there is no correlation between horizontal lines.

The determining circuit 305e of the color/luminance correlation determining circuit 305 selects a YC separation method in the following manner using the foregoing determination result and the result of the detection made by the edge detector circuit 304.

First, when no changing edge is detected, the determining circuit 305e selects the three-line comb filter based separation method if there is a correlation among the horizontal line L0, L1, L2; selects the two line comb filter based separation method using the signals C0, C1 if there is a correlation only between the horizontal lines L0, L1; and selects the two line comb filter based separation method using the signals C0, C2 if there is a correlation only between the horizontal lines L0, L2. Further, the determining circuit 305e selects the three-line comb filter based separation method if there is no correlation among the horizontal lines L0, L1, L2. The reason for which the three-line comb filter based separation method is used if there is not any correlation existing among the horizontal lines is similar to the first embodiment. Alternatively, the YC separator circuit 300 may be designed such that the output of the trap filter is employed without fail in such a case.

On the other hand, when a changing edge is detected, the determining circuit 305e selects the three-line comb filter based separation method if the result of the correlation determination has been changed from the preceding pixel; and selects the same separation method as the preceding pixel if the result of the correlation determination is the same as that for the preceding pixel. The reason for which the three-line comb filter based separation method is used if the result of the correlation determination has been changed is similar to the first embodiment. Alternatively, the determination on the correlation may be made again for such a case.

The YC separation filter circuit 109 separates a C signal using the separation method selected by the color/luminance correlation determining circuit 305. Specifically, when the color/luminance correlation determining circuit 305 has selected the two-line comb filter based separation method using the signals C0, C1, the YC separation filter circuit 109 separates the C signal by dividing the difference between the signals C0, C1 by two. Also, when the color/luminance correlation determining circuit 305 has selected the two-line comb filter based separation method using the signals C0, C2, the YC separation filter circuit 109 separates the C signal by dividing the difference between the signals C0, C2 by two. Further, when the color/luminance correlation determining circuit 305 has selected the three-line comb filter separation method, the YC separation filter circuit 109 calculates an average value of "the difference between the signals C0, C1 divided by two" and "the difference between the signals C0, C2 divided by two" to separate the C signal. The C signal thus separated is output to the outside, and is also sent to the subtractor 110.

The subtractor 110 subtracts the C signal output by the YC separation filter circuit 109 from the composite signal to separate the Y signal. This Y signal is sent to the selector 112 and to the luminance correlation determining circuit 111.

As mentioned above, the luminance correlation determining circuit 111 selects the Y signal in accordance with the value of this difference when the edge detector circuit 304 does not detect an edge. Specifically, the luminance correlation determining circuit 111 selects the subtractor 110 when the difference is larger than a predetermined value, and selects the trap filter when the difference is smaller than the predetermined value. On the other hand, when the edge detector circuit 304 detects an edge, the subtractor 110 is selected. The result of the selection is sent to the selector 112. Then, the selector 112 outputs a Y signal in accordance with this result of the selection.

In the YC separator circuit 300 of this embodiment, only when changing edges are detected in all of three sequential horizontal lines L0, L1, L2, it is determined that a luminance changing edge exists. In this way, when a luminance border line has a small slope θ, a changing edge is more readily determined to exist, whereas when a luminance border line has a large slope θ, a changing edge is less readily determined to exist. FIGS. 7A, 7B are conceptual diagrams for explaining the relationship between the slope θ of a luminance border line and the result of detecting a changing edge. In FIGS. 7A, 7B, letters a, b, c designate output potentials of respective AND gates 212 in FIG. 6, and a letter d designates an output potential of the OR gate 401. As shown in FIG. 7A, as the slope is smaller, changing edge detecting periods of the respective signal lines L0-L2 are less likely to overlap. On the contrary, as shown in FIG. 7B, as the slope θ is larger, the changing edge detecting periods of the respective horizontal lines L0-L2 are more likely to overlap. Therefore, when the slope θ is smaller, the output of the subtractor 110 is selected with a higher probability. When the slope θ is larger, the output of the trap filter is selected with a higher probability. Consequently, according to this embodiment, the YC separation can be improved in accuracy.

In addition, the YC separator circuit 300 of this embodiment also determines the correlation for the Y signals Y0, Y1, Y2, in addition to the C signals C0, C1, C2. Thus, according to this embodiment, the YC separation can be improved in accuracy.

Third Embodiment

Next, a YC separator circuit according to a third embodiment will be described with reference to FIGS. 8 and 9.

Figure 8:
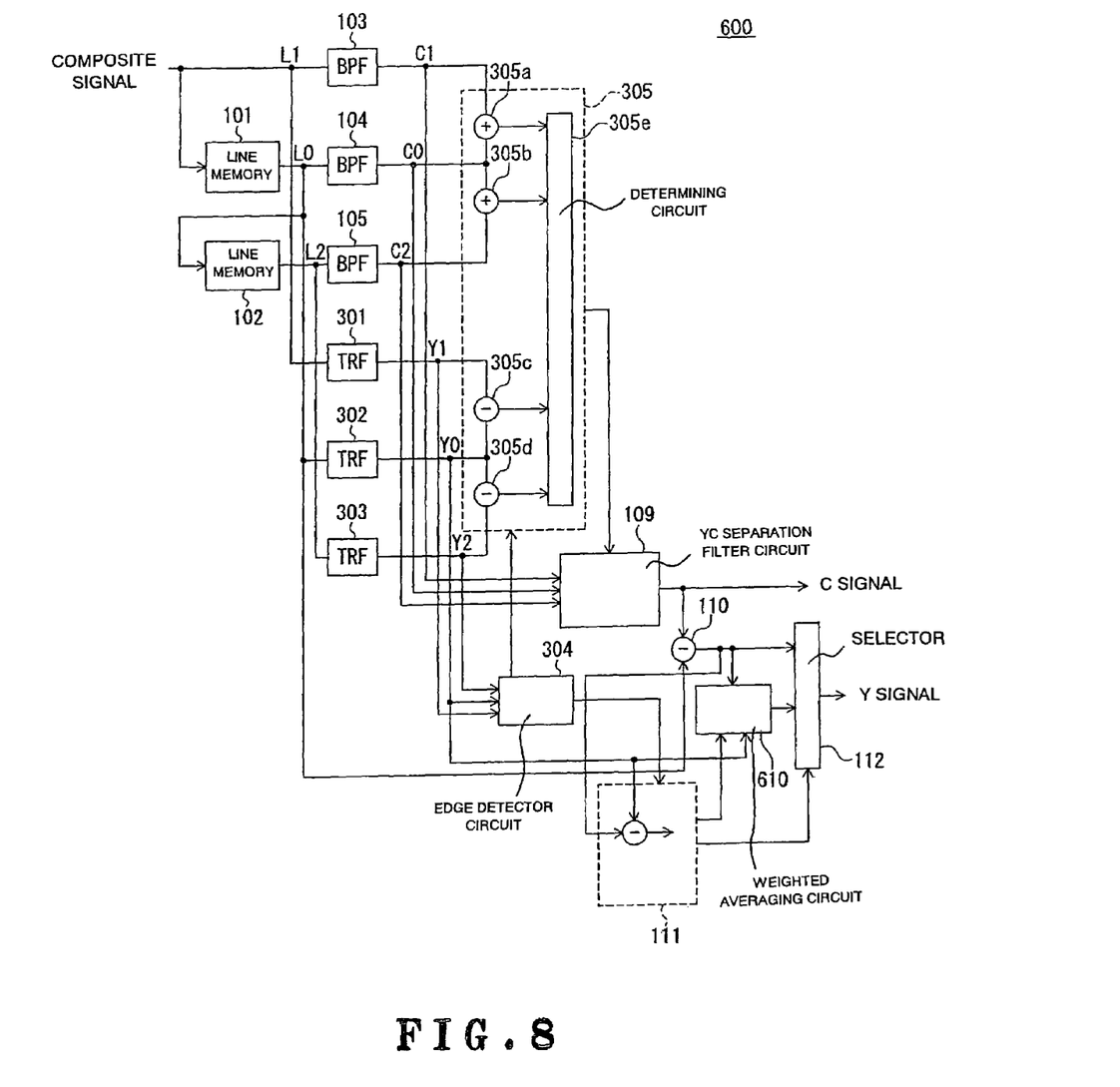
FIG. 8 is a block diagram generally showing the overall configuration of a YC separator circuit according to a third embodiment.

FIG. 8 is a block diagram generally showing the configuration of the YC separator circuit 600 according to this embodiment. In FIG. 8, components designated the same reference numerals as those in FIG. 5 identify the same components in FIG. 5.

The YC separator circuit 600 according to this embodiment differs from the YC separator circuit 300 according to the second embodiment in that a weighted averaging circuit 610 is provided.

Figure 9:
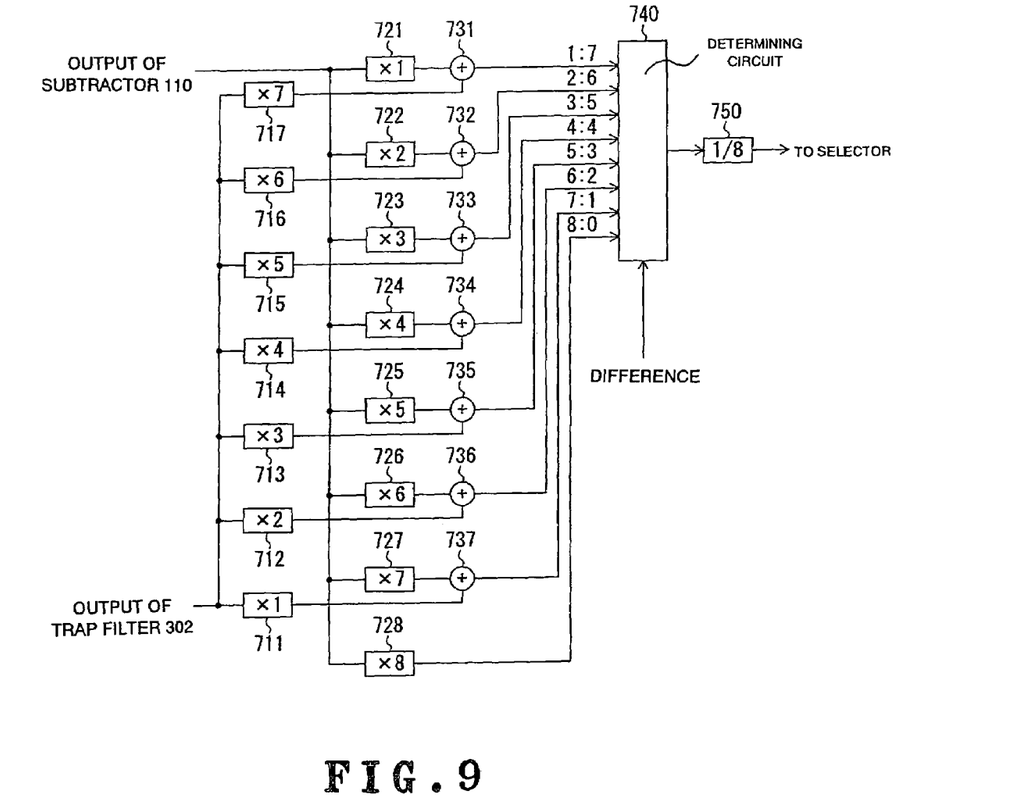
FIG. 9 is a block diagram generally showing the internal configuration of a weighted averaging circuit according to the third embodiment.

FIG. 9 is a block diagram generally showing the internal configuration of the weighted averaging circuit 610. As shown in FIG. 9, the weighted averaging circuit 610 comprises multipliers 711-717, 721-728; adders 731-737; a determining circuit 740; and a divider 750.

Here, The multiplier 711, 721 each multiply an input signal by a factor of one; the multipliers 712, 722 multiply the input signal by a factor of two; the multipliers 713, 724 multiply the input signal by a factor of three; the multipliers 714, 724 multiply the input signal by a factor of four; the multipliers 715 725 multiply the input signal by a factor of five; the multipliers 716, 726 multiply the input signal by a factor of six; the multipliers 717, 727 multiply the input signal by a factor of seven; and the multiplier 728 multiplies the input signal by a factor of eight.

The adder 731 adds output values of the multipliers 717, 721; the adder 732 adds output values of the multipliers 716, 722; the adder 733 adds output values of the multipliers 715, 723; the adder 734 adds output values of multipliers 714, 724; the adder 735 adds output values of the multipliers 713, 725; the adder 736 adds output values of the multipliers 712, 726; and the adder 737 adds output values of the multipliers 711, 712.

The determining circuit 740 selects one of the results of calculations made by the adders 731-737 and multiplier 728 in accordance with the value of the difference input from the luminance correlation determining circuit 111. This determination can be made, for example, by comparing seven comparison values V0, V1, . . . , V6 (V0<V1< . . . <V6) with the difference one by one. Specifically, the determining circuit 740 may select the results of the calculations, in such a manner that it selects the multiplier 728 when the difference ΔV is smaller than V0, and selects the adder 737 when V0=ΔV<V1.

The divider 750 divides the result of the calculation selected by the determining circuit 740 by eight, and outputs the result of the division.

According to the foregoing configuration, it is possible to output any of two types of input Y-signals which are weighted by one of 1:7, 2:6, 3:5, 4:4, 5:3, 6:2, 7:1, and 8:0, and averaged.

The operation of the YC separator circuit 600 according to this embodiment is generally the same as the operation of the aforementioned YC separator circuit 300 according to the second embodiment. However, the luminance correlation determining circuit 111 selects the weighted averaging circuit 610 rather than the trap filter when the edge detector circuit 304 does not detect a changing edge, and when the result of calculating the difference is smaller than a predetermined value (called herein the "first predetermined value"). Then, the weighted averaging circuit 610 selects the output of the multiplier 728 when the difference is smaller than a second predetermined value V0 (first predetermined value>second predetermined value). Further, the weighted averaging circuit 610 determines a weighting ratio in accordance with the result of comparisons with other comparison values V1-V6, when the difference is larger than the second predetermined value V0. Consequently, the ratio of the two types of Y signals is one of 0:8, 1:7, 2:6, 3:5, 4:4, 5:3, 6:2, 7:1, 8:0.

As described above, the YC separator circuit 600 according to this embodiment can weight the signal separated by the subtractor 110 and the Y signal separated by the trap filter 302 in accordance with the magnitude of the difference. Consequently, the luminance component will not suddenly switch in a border region in which the luminance largely changes, thus making it possible to smoothly switch the luminance.

While the foregoing embodiment has shown nine types of weighting, eight types or less or ten types or more of weighting may be employed, as a matter of course.

This application is based on Japanese Patent Application No. 2004-200503 which is herein incorporated by reference.

What is claimed is:

1. A YC separator circuit comprising:
   a color signal separator circuit for separating a color signal from a composite signal using a two-line comb filter or a three-line comb filter;
   a first luminance signal separator circuit for separating a luminance signal by subtracting the color signal separated by said color signal separator circuit from said composite signal;
   a second luminance signal separator circuit for separating a luminance signal from said composite signal using a frequency filter;
   a luminance correlation determining circuit for calculating a difference between respective luminance signals input from said first and second luminance signal separator circuits; and
   a selector circuit for selectively outputting the luminance signal separated by said first luminance signal separator circuit when said difference is larger than a predetermined value, and for selectively outputting the luminance signal separated by said second luminance signal separator circuit when said difference is smaller than a second predetermined value (first predetermined value=second predetermined value).

2. A YC separator circuit according to claim 1, wherein said color signal separator circuit comprises:
   three bandpass filters for extracting color signals from said composite signal corresponding to first, second, and third sequential horizontal lines, respectively;
   a color correlation determining circuit for outputting a first value when a color signal of said second horizontal line has a correlation with a color signal of only one of said first and third horizontal lines, and otherwise for outputting a second value;
   an edge detector circuit for detecting a changing edge of a luminance signal applied from said second luminance signal separator circuit; and
   a YC separation filter circuit for selecting a color signal from said second horizontal line using a two-line combe filter based separation method when the changing edge is not detected and when the output of said color correlation determination circuit is equal to said first value; using a three-line comb filter based separation method when said changing edge is not detected, and when the output of said color correlation determining circuit is equal to said second value; using said three-line comb filter based separation method when the changing edge is detected, and when the output value of said color correlation determining circuit has changed; and using the same color signal separation method as the preceding pixel when the changing edge is detected, and when the output value of said color correlation determining circuit does not change.

3. A YC separator circuit according to claim 1, wherein:
   said second luminance signal separator circuit comprises three of said frequency filters for extracting luminance signals from the composite signals corresponding to the first, second, and third sequential horizontal lines, respectively, and
   said color signal separator circuit comprises:
   three bandpass filters for extracting color signals from the composite signals corresponding to the first, second, and third horizontal lines, respectively;
   a color/luminance correlation determining circuit for outputting a first value when the color signal and luminance signal of said second horizontal line have a correlation with the color signal and luminance signal of only one of said first and third horizontal lines, and otherwise for outputting a second value;
   an edge detector circuit for detecting a changing edge of each luminance signal input from said second luminance signal separator circuit, and turning on an edge detection signal when changing edges are detected from all the luminance signals; and
   a YC separation filter circuit for separating a color signal from said second horizontal line using a two-line comb filter based separation method when said edge detection signal is turned off, and when said color/luminance correlation determining circuits outputs said first value; using a third-line comb filter based separation method when said edge detection signal is turned off, and said color/luminance correlation determining circuit outputs said second value; and using the same color signal separation method as the preceding pixel when said edge detection signal is turned on.

4. A YC separator circuit according to claim 1, wherein said selector circuit outputs a luminance signal calculated value produced by weighting and averaging luminance signals separated by said first and second luminance signal separator circuits in accordance with the magnitude of the difference when the difference is smaller than said first predetermined value and larger than said second predetermined value.

5. A YC separator circuit according to claim 2, wherein said selector circuit outputs a luminance signal calculated value produced by weighting and averaging luminance signals separated by said first and second luminance signal separator circuits in accordance with the magnitude of the difference when the difference is smaller than said first predetermined value and larger than said second predetermined value.

6. A YC separator circuit according to claim 3, wherein said selector circuit outputs a luminance signal calculated value produced by weighting and averaging luminance signals separated by said first and second luminance signal separator circuits in accordance with the magnitude of the difference when the difference is smaller than said first predetermined value and larger than said second predetermined value.

7. A YC separator circuit according to claim 1, wherein:
   when said changing edge is detected on any of said first to third horizontal lines, the luminance signal separated by said first luminance signal separator circuit is output from said selector circuit irrespective of the magnitude of the difference.

8. A YC separator circuit according to claim 2, wherein:
   when said changing edge is detected on any of said first to third horizontal lines, the luminance signal separated by said first luminance signal separator circuit is output from said selector circuit irrespective of the magnitude of the difference.

9. A YC separator circuit according to claim 3, wherein:
   when said changing edge is detected on any of said first to third horizontal lines, the luminance signal separated by said first luminance signal separator circuit is output from said selector circuit irrespective of the magnitude of the difference.

10. A YC separator circuit according to claim 4, wherein:
when said changing edge is detected on any of said first to third horizontal lines, the luminance signal separated by said first luminance signal separator circuit is output from said selector circuit irrespective of the magnitude of the difference.

11. A YC separator circuit according to claim 5, wherein:
when said changing edge is detected on any of said first to third horizontal lines, the luminance signal separated by said first luminance signal separator circuit is output from said selector circuit irrespective of the magnitude of the difference.

12. A YC separator circuit according to claim 6, wherein:
when said changing edge is detected on any of said first to third horizontal lines, the luminance signal separated by said first luminance signal separator circuit is output from said selector circuit irrespective of the magnitude of the difference.

* * * * *